Figure 5:
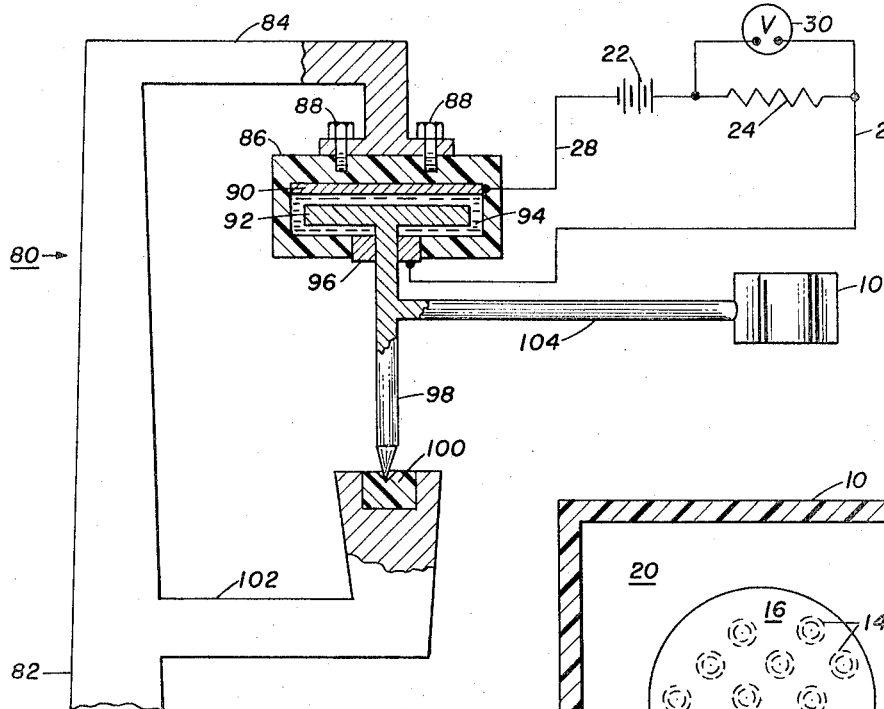

March 21, 1967   R. B. McEUEN ETAL   3,309,915
APPARATUS FOR CONVERTING MECHANICAL ENERGY
TO ELECTRICAL ENERGY
Filed Dec. 23, 1963   2 Sheets-Sheet 1

INVENTORS.
ROBERT B. McEUEN
THOMAS W. MARTINEK
BY ROBERT M. HAINES
DONALD L. KLASS

ATTORNEY.

March 21, 1967  R. B. McEUEN ETAL  3,309,915
APPARATUS FOR CONVERTING MECHANICAL ENERGY
TO ELECTRICAL ENERGY
Filed Dec. 23, 1963  2 Sheets-Sheet 2
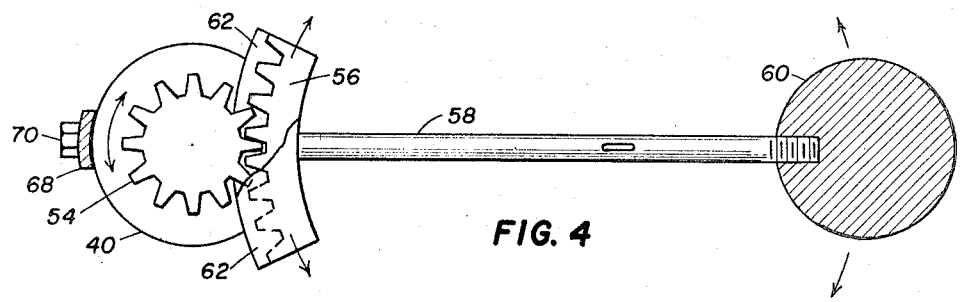
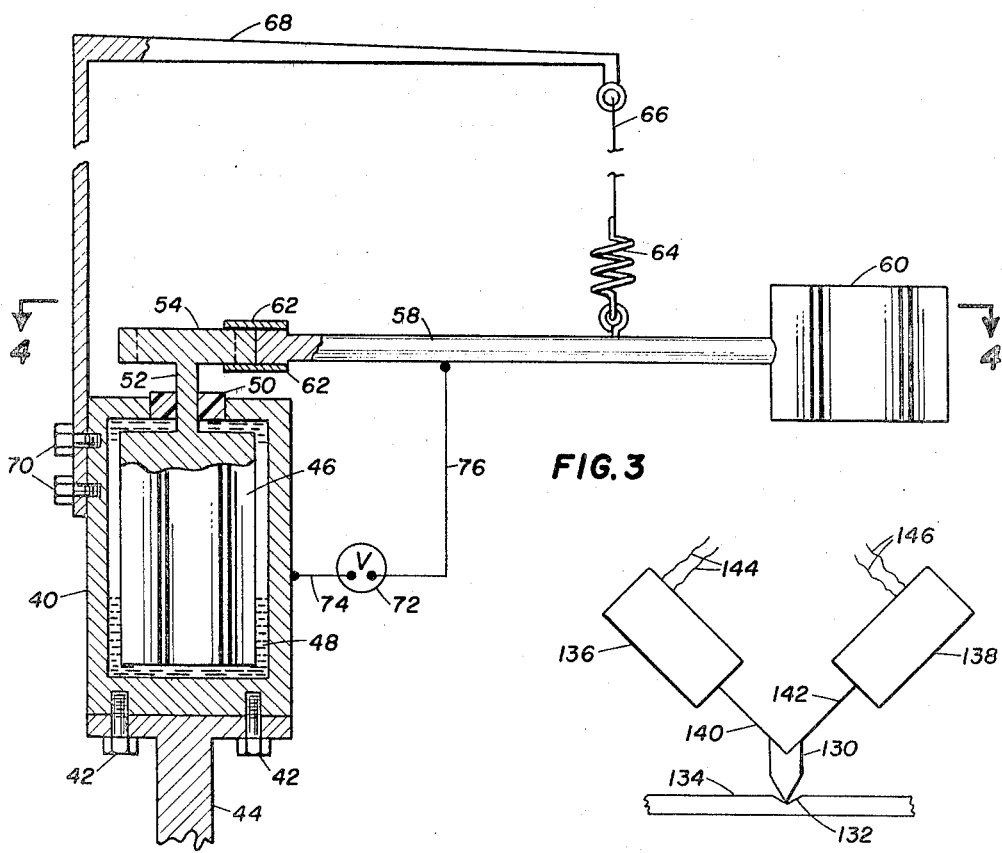
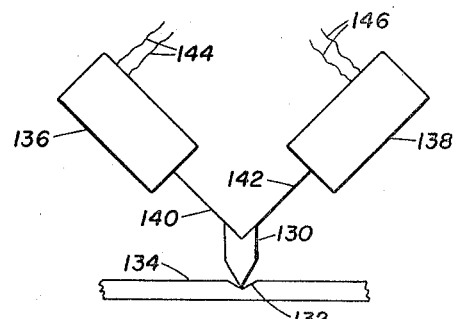
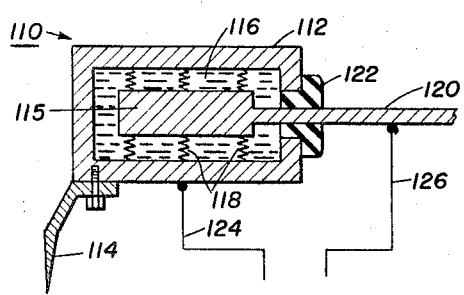
INVENTORS.
ROBERT B. McEUEN
THOMAS W. MARTINEK
BY ROBERT M. HAINES
DONALD L. KLASS
ATTORNEY.

United States Patent Office 3,309,915
Patented Mar. 21, 1967

3,309,915
APPARATUS FOR CONVERTING MECHANICAL ENERGY TO ELECTRICAL ENERGY
Robert B. McEuen, Barrington, Robert M. Haines, Crystal Lake, Donald L. Klass, Barrington, and Thomas W. Martinek, Crystal Lake, Ill., assignors, by mesne assignments, to Union Oil Company of California, Los Angeles, Calif., a corporation of California
Filed Dec. 23, 1963, Ser. No. 332,482
17 Claims. (Cl. 73—71.2)

This invention relates to transducers utilizing shear-responsive liquids, i.e. suspensions of non-conducting particles in oleaginous vehicles of relatively low dielectric constant, for converting mechanical energy into electrical energy.

A number of electrical phenomena are exhibited when certain colloidal suspensions in oils are subjected to shear stresses. When a film of a suspension of non-conducting particles in an oleaginous vehicle of relatively low dielectric constant, such as a dispersion of silica in a mineral oil, is subjected to shear stress as between opposing surfaces of two bodies moving with respect to each other, the film exhibits changes in electrical properties, such as a decrease in D.C. resistance, a change in dielectric constant, and the generation of an induced potential. The magnitude of each of these phenomena depends upon the shear rate, the fluid composition, the fluid temperature, and the spacing between the opposing surfaces, and, in addition, the magnitude of the induced potential depends upon the compositions of the opposing surfaces. For the purpose of this application, such suspensions are hereinafter designated "shear-responsive" or "electrodynamic" fluids or liquids and the associated phenomena are hereinafter designated as the "electrokinetic properties" of the fluids.

This invention is based on transducers utilizing shear-responsive liquids for converting vibratory motion into an electric signal. The transducers of this invention comprise two spaced bodies having opposing electrically conductive surfaces between which a shear-responsive liquid is confined. The bodies are mounted for vibration-sensitive relative movement with respect to each other with the opposing surfaces being substantially uniformly spaced. Electrically connected to the electrically conductive surfaces is an electric circuit for indicating or utilizing the change in an electrokinetic property of the shear-responsive liquid.

The apparatus of this invention is useful in various measuring devices, in phonograph pick-ups, seismometers for geophysical prospecting, etc.

Figure 2:
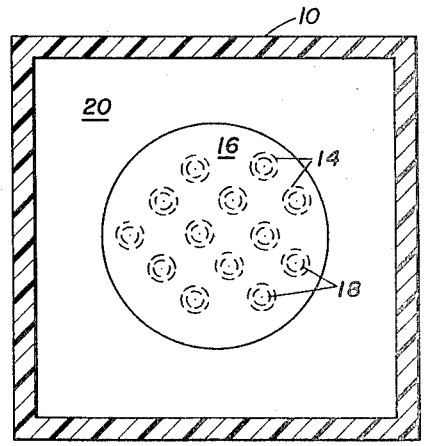
Figure 1:
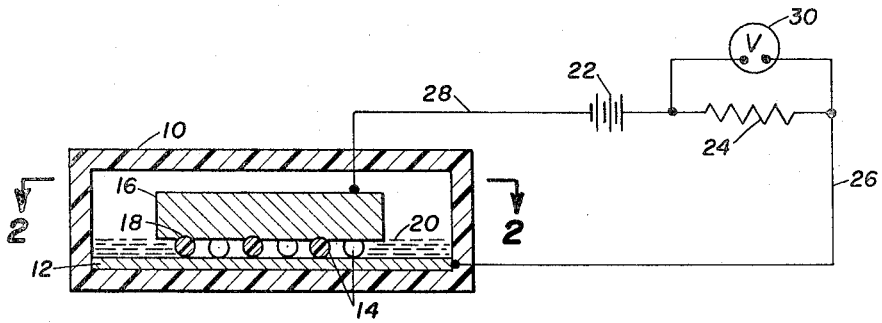

It is therefore an object of this invention to provide a transducer for converting mechanical energy into electrical energy. Another object of this invention is to provide a transducer for generating an electric signal proportional to an input vibratory motion. Still another object of this invention is to provide a transducer utilizing a dispersion of non-conducting particles in an oleaginous vehicle of low dielectric constant. A still further object of this invention is to provide phonograph pick-ups and seismometers utilizing transducing means including a suspension of non-conducting particles in an oleaginous vehicle of low dielectric constant. These and further objects of this invention will become apparent or be described as the description thereof herein proceeds and reference is made to the accompanying drawings in which:

FIGURE 1 is an elevational view, partly in section and partly schematic, of an omnidirectional seismometer constructed in accordance with this invention, FIGURE 2 is a sectional view in the plane 2—2 of FIGURE 1, FIGURE 3 is an elevational view, partly in section and partly schematic, of a horizontal seismometer fabricated in accordance with this invention, FIGURE 4 is a sectional view in the plane 4—4 of FIGURE 3, FIGURE 5 is an elevational view, partly in section and partly schematic, of an alternative embodiment of a horizontal seismometer of this invention, FIGURE 6 is a sectional view of a monaural phonograph pick-up fabricated in accordance with this invention, and FIGURE 7 is a diagrammatic representation illustrating a binaural phonograph pick-up of this invention, Referring to FIGURES 1 and 2, the reference numeral 10 designates the seismometer housing, which is fabricated of an electrically non-conductive material such as Teflon, nylon, Bakelite, etc. and contains substantially flat, electrically conductive plate 12 on the bottom wall thereof. Movably supported above plate 12 by non-conductive spheres 14 is inertial mass 16, which is fabricated of an electrically conductive material. As it can be clearly seen in FIGURE 2, inertial mass 16 is smaller than plate 12 so that inertial mass 16 is freely movable in all directions with respect to plate 12.

The surface of inertial mass 16, which is opposed to plate 12, is substantially flat and preferably includes pits, or concave depressions, 18 in which portions of spheres 14 are received to maintain spheres 14 between inertial mass 16 and plate 12 as inertial mass 16 is moved. Housing 10 also contains shear-responsive liquid 20 in an amount such that the opposing surfaces of plate 12 and mass 16 are in contact with shear-responsive liquid 20 regardless of the position of mass 16.

The electrical indicating circuit comprises D.C. potential source 22 and resistor 24 series connected between plate 12 and mass 16 by lead wires 26 and 28. Voltmeter 30 is parallel connected with resistor 24 to indicate the IR drop across resistor 24. As a specific example of the indicating circuit, potential source 22 is a 10 volt D.C. potential source and resistor 24 is a 1000 ohm resistor, while voltmeter 30 is capable of reading fractional voltages.

The operation of the seismometer depicted in FIGURES 1 and 2 will be apparent. Assuming a horizontal seismic wave is received from any direction, housing 10 is moved while mass 16 is maintained in a stationary position due to inertia. Since the relative movement of plate 12 and inertial mass 16 with respect to each other, and hence the rate at which the shear-responsive liquid is sheared, is proportional to the seismic wave and the change in D.C. resistance of a shear-responsive liquid is proportional to the shear rate, the change in IR drop across resistor 24, which is indicated by voltmeter 30, will be proportional to the energy of the seismic wave.

Various modifications of the omnidirectional seismometer will be apparent to those skilled in the art. For example, other means for maintaining inertial mass 16 and plate 12 substantially uniformly spaced from each other while permitting the movement of mass 16 will be obvious. The seismometer may be fabricated so as to respond to horizontal seismic waves in only one direction by supporting inertial mass 16 from spaced parallel rods, which rods extend through longitudinal openings through mass 16 and are supported on opposite side walls of housing 10. If desired, other indicating circuits may be used, such as a voltmeter connected between plate 12 and mass 16 to indicate the potential generated by the shearing of shear-responsive liquid 20.

Referring to FIGURES 3 and 4, which illustrate a horizontal seismometer fabricated in accordance with this invention, hollow cylinder 40 is secured by bolts 42 to frame 44, which is anchored in bedrock. Rotatably supported within hollow cylinder 40 is cylindrical member 46 having an electrically conductive outer surface. Cylindrical member 46 is spaced inwardly from and concentric with the electrically conductive inner surface of hollow cylinder 40. A film of a shear-responsive liquid 48 is confined between the opposing surfaces of hollow cylinder 40 and cylindrical member 46. Extending axially of cylindrical member 46 through electrically non-conductive bearing 50 is trunnion 52, on which gear wheel 54 is supported.

Gear wheel 54 meshes with section gear 56 on the end of support rod 58. Supported by rod 58 on the end thereof opposite section gear 56 is inertial mass 60. Support rod 58 preferably includes guide members 62 on both sides of section gear 56 to prevent vertical movement of section gear 56 with respect to gear wheel 54. Support rod 58 is supported, preferably at the balance point of the assembly comprising section gear 56, support rod 58, and inertial mass 60, by spring 64 and electrically non-conductive cord 66. Cord 66 is supported from L-shaped bracket 68, which is secured to hollow cylinder 40 by bolts 70.

In operation, assuming that the axis of hollow cylinder 40 is positioned perpendicular to the earth and shaft 58 is perpendicular to a line connecting the seismic source and the seismometer, an elastic wave propagated from the source to the seismometer causes hollow cylinder 40 to move horizontally while mass 60 is maintained substantially stationary due to inertia. As a result, relative rotational movement occurs between hollow cylinder 40 and cylindrical member 46 to shear-responsive liquid 48 therebetween. The degree of the relative movement of cylindrical member 46 with respect to hollow cylinder 40 will be proportional to the energy of the seismic wave so that the change in an electrokinetic property of the shear-responsive liquid 48 will be proportional to the energy of the seismic wave. The indicating circuit used in accordance with this apparatus may be one for detecting a change in an electrical property of the shear-responsive liquid, such as described as respect to FIGURES 1 and 2, or for indicating a potential generated by the shear-responsive liquid. As an example of the latter circuit, voltmeter 72, which is capable of reading fractional voltages, is connected by lead wires 74 and 76 to hollow cylinder 40 and support rod 58 in electrically conductive relationship with hollow cylinder 46, respectively.

Various modifications of the horizontal seismometer illustrated in FIGURES 3 and 4 will be apparent to one skilled in the art. An example of an alternate embodiment of the horizontal seismometer is illustrated in FIGURE 5, wherein C-shaped support bracket 80 is mounted on base 82, which is anchored in bedrock. Support bracket 80 includes upper horizontal support 84 from which electrically non-conductive, cylindrical housing 86 is supported by bolts 88. Housing 86 includes on the upper inner wall thereof electrically conductive plate 90 and rotatably mounted, cylindrical disk 92, which is spaced from plate 90. Housing 86 also includes shear-responsive liquid 94 in an amount such that the opposing electrically conductive surfaces of plate 90 and disk 92 are in contact with shear-responsive liquid 94. Extending axially of disk 92 through electrically conductive bearing 96 is electrically conductive axle 98. The lower end of axle 98 is supported in electrically non-conductive bearing 100 in lower horizontal support 102. Extending from axle 98 in a direction substantially normal to the axis of axle 98 is support arm 104 from which inertial mass 106 is supported.

The electrical indicating circuit is the same as that described with respect to FIGURES 1 and 2, namely, D.C. potential source 22 and resistor 24 are series connected by lead wires 26 and 28 to bearing 96 and plate 90, respectively. Voltmeter 30 is parallel connected across resistor 24 to indicate the IR drop across resistor 24.

Numerous other variations of the horizontal seismometer will be apparent. As for example, the seismometer illustrated in FIGURE 5 can be changed so that the axis of axle 98 is horizontal rather than vertical and the opposing surfaces of plate 90 and disk 92 are in vertical planes. With such a change in structure, the seismometer can still be used as a horizontal seismometer if inertial mass 106 is freely suspended by support 104 from axis 98. On the other hand, if support arm 104 were supported so that support arm 104 extends horizontally, as for example, as support arm 58 of the seismometer illustrated in FIGURES 3 and 4 is supported, the seismometer will function as a verticle seismometer.

The operation of the seismometer illustrated in FIGURE 5 is identical to the operation of the seismometer illustrated in FIGURES 3 and 4 except that the energy of the seismic wave is determined by observing the IR drop across resistor 24 rather than the voltage generated by the shear-responsive liquid.

As hereinbefore disclosed, the transducing means of this invention is useful in phonograph pick-ups as well as in seismic detectors. Reference is now made to FIGURE 6 which illustrates a phonograph pick-up contructed in accordance with this invention. Referring to FIGURE 6, the reference numeral 110 designates the transducer which includes electrically conductive housing 112 to which record-engaging needle or stylus 114 is secured. Disposed within housing 112 is disk 115, which is fabricated of an electrically conductive material, and shear-responsive liquid 116, which occupies the space between housing 112 and disk 115. Disk 115 is maintained spaced from housing 112 by electrically non-conductive springs 118 so that housing 112 is movable with respect to disk 115. Transducer 110 is attached to the phonograph pick-up arm by conductive extension arm 120, which extends from disk 115 through soft rubber sealing plug 122. The transducer is connected to an external circuit, as for example, an audio circuit, by lead wires 124 and 126, which are connected to housing 112 and disk 115 through extension arm 120, respectively. Vibration of needle 114 caused by the movement thereof on a phonograph record would transmit mechanical energy to vibrate housing 112 with respect to disk 115. This movement of housing 112 with respect to disk 115 will shear the shear-responsive liquid to change the electrokinetic properties thereof in proportion to the movement of needle 114, which change is transmitted through lead wires 124 and 126 to the associated circuit.

It will be evident that the shearing of the shear-responsive liquid occurs twice for each input signal so that the ouput signal of the transducer will be twice the frequency of the input signal. The necessary fidelity of an audio system utilizing this pick-up may be obtained by applying a polarizing voltage across disk 115 and housing 112 to produce an output signal of the same frequency as the input signal.

It will be apparent that various modifications of thephonograph pick-up may be made by one skilled in the art without departing from the intended scope of this invention. For example, the transducer housing may be securely attached to the phonograph pick-up arm while the disk disposed in the shear-responsive liquid in the transducer housing is connected to the needle so that the disk moves with respect to the housing in response to the virbration of the needle.

One skilled in the art will immediately cognize that the principles hereinbefore described with respect to a monaural photograph pick-up are also applicable to binaural pick-ups. Referring to FIGURE 7, wherein a binaural phonograph pick-up is diagrammatically illustrated, stylus 130 is shown as engaging groove 132 in record 134. Stylus 130 is mechanically connected to shear-responsive liquid containing transducers 136 and 138 by rigid link arms 140 and 142, respectively. Link arms 140 and 142 are shown to be 45° displaced with respect to the upper surface of record 134. Transducers 136 and 138 may be of the type illustrated in FIGURE 6, i.e., having housings connected to stylus 130 so that they are movable with respect to the disposed disk or plate; or stylus 130 may be connected to movable disposed plates disposed in housings which are stationary with respect to stylus 130. The output signals of transducers 136 and 138 are fed through lead wires 144 and 146 to the associated electric circuit. The operation of this pick-up will readily be apparent. Each of transducers 136 and 138 is responsive to different components of the motion of stylus 130, each component being displaced substantially 45° with respect to the surface of record 134.

The shear-responsive liquid utilized in the apparatus and method of this invention form no part of the invention, and, for the purpose of this application, the term "liquid" is intended to include liquids in the ordinary meaning of the term, i.e., readily flowing fluids, as well as more viscous compositions, e.g., those having a grease-like consistency. In general, the shear-responsive liquids will contsist of at least about 10% by volume of particulate non-conducting materials (particles of either a piezoelectric or non-piezoelectric material) dispersed in a non-polar oleaginous vehicle, which is weakly absorbed by the particulate material and has a dielectric constant less than about 5. The non-conducting particles should be of an average size in the range of about .010 to 5.0 microns diameter, and preferably have an average particle size of about 0.1 to 2.0 microns diameter. Finely divided silica is especially useful for use in shear-responsive liquids. Examples of other non-conducting particles which may be used include aluminum octoate, aluminum oleate, aluminum stearate, barium titanate, calcium stearate, activated charcoal, crystalline D-sorbitol, lead oxide, lithium stearate, magnesium silicate, micronized mica, white betonite, zinc stearate, vanadium pentoxide, aluminum acetate, and solid chlorinated hydrocarbons which are marketed under the proprietary name of Aroclors of Monsanto Chemical Company.

The oleaginous vehicle in which the non-conducting particles are dispersed is preferably a refined mineral oil fraction having a viscosity within the range of about 50 to 300 SUS at 100 degrees F. and an initial boiling point greater than about 500° F. However, a wide variety of non-polar oleaginous materials which are weakly absorbed by the non-conducting particles can be employed. The vehicle can be considered to be only weakly absorbed when it is less strongly absorbed by the particles than are the other shear-responsive liquid constituents. Examples of suitable materials include white oils, lubricating oil stocks such as 85 vis. neutral oil, transformer oils, synthetic oils resulting from polymerization of unsaturated hydrocarbons, alpha methyl benzyl ether, benzene, bromocyclohexane, chlorinated paraffin, dibenzyl ether, dichloroethyl ether, fluorinated hydrocarbons in the lubricating-oil viscosity range, N-butyl ether, silicate ester, toluene, tributyl phosphate, etc.

Where relatively large volumes of the non-conducting particles in the preferred range are incorporated in the shear-responsive liquid, it is usually necessary to add a material to fluidize the mixture and keep the viscosity of the product shear-responsive liquid at a reasonable level. For this purpose, varying amounts of a neutral surfactant can be incorporated to maintain the mixture of silica and vehicle as a fluid. Suitable neutral surfactants which may be used are selected from the polyoxyalkylene ethers, hydroxyethers, polyhydroxy-ethers and esters, as well as neutral sulfonates and other neutral surfactants. Other neutral polar organic materials such as $C_2$—$C_{30}$ mono- or polyhydric alcohols are suitable fluidizers. Suitable neutral fluidizers include glycerol monooleate, sorbitan sesquioleate, glycol monooleate, alkyl aryl polyether alcohols, sodium dialkylsulfosuccinate, hexyl ether alcohol, butyl Cellosolve, octyl alcohol and dodecyl alcohol. The neutral fluidizer should be added in quantities sufficient to fluidize the mixture of vehicle and particles but no more than is necessary to obtain sufficient fluidity is normally used. The amount added will seldom exceed about 25% by volume.

A variety of polar materials, including water, may be used to alter the electrical properties of the shear-responsive liquid. Lower hydroxy-substituted hydrocarbons have been found to be highly efficient. Especially preferred are the aliphatic polyhydroly-substituted hydrocarbons such as ethylene glycol. In general, activating material in the range of about 1 to 10% by volume will be added to the shear-responsive liquid.

The following is given as a specific example of one shear-responsive liquid which may be used:

| | Weight percent |
|---|---|
| Silica | 48.48 |
| Water (adsorbed on the silica) | 6.18 |
| Gycerol monooleate | 17.75 |
| 85 vis. neutral oil | 27.59 |

In constructing the transducers of this invention, the materials of which the opposing surfaces between which the shear-responsive liquids are confined are not critical. However, it is preferred that the opposing surfaces be fabricated of dissimilar metals when the indicating circuit is meant to detect the generated potential inasmuch as a greater potential will be generated when the opposing surfaces are fabricated of dissimilar metals rather than similar metals. In general, the thickness of the shear-responsive liquid films between the opposing electrically conducting surfaces will be about 0.002 to 0.200 inch, although other spacings may be utilized.

The embodiments of the invention in which an exclusive property or privilege is claimed are defined as folllows:

1. A seismometer comprising two spaced bodies mounted for relative movement and having opposing, electrically conductive surfaces, a shear-responsive liquid confined in the space between said electrically conductive surfaces, inertial means adapted to move said bodies with respect to each other when said seismometer is subjected to vibration and an electrical circuit connected between said electrically conductive surfaces to measure a change in electrokinetic property of the liquid.

2. A seismometer in accordance with claim 1 in which said electrically conductive surfaces are substantially flat surfaces.

3. A seismometer in accordance with claim 2 in which one of said bodies is supported above the other body and said opposing, electrically conductive surfaces are in horizontal planes.

4. A seismometer in accordance with claim 3 in which the upper body includes said inertial means.

5. A seismometer in accordance with claim 4 in which the area of said electrically conductive surface of the upper body is less than the area of said electrically conductive surface of the lower body.

6. A seismometer in accordance with claim 5 in which a plurality of electrically non-conductive spheres between said opposing, electrically conductive surfaces movably supports said one body above said other body.

7. A seismometer in accordance with claim 5 in which said electric circuit is adapted to indicate a change in the resistivity of said shear-responsive liquid.

8. A seismometer in accordance with claim 1 in which said bodies are disks.

9. A seismometer in accordance with claim 1 in which said opposing surfaces are cylindrical.

10. A seismometer in accordance with claim 1 in which one of said bodies is rotatable about a vertical axis with respect to the other body and said inertial means is supported horizontally with respect to the rotatable body.

11. A seismometer in accordance with claim 1 in which the electric circuit is designed for measuring voltage generated by said shear-responsive liquid.

12. A seismometer in accordance with claim 1 in which the electric circuit is designed for measuring a change in the resistivity of the shear-responsive liquid.

13. A phonograph pick-up comprising two bodies having spaced, opposing, electrically conductive surfaces, one of said bodies being supported for relative movement with respect to the other body, a shear-responsive liquid confined between said bodies, a stylus mechanically connected to the movable body to impress the stylus vibrations upon the movable body and means for electrically connecting the conductive surfaces to an external circuit designed to respond to a change in an electrokinetic property of the liquid.

14. A phonograph pick-up in accordance with claim 13 in which said bodies are a housing having an electrically conductive inner surface and a disk having an electrically conductive outer surface disposed within said housing.

15. A phonograph pick-up in accordance with claim 14 in which said stylus is connected to said housing.

16. A phonograph pick-up in accordance with claim 15 in which said disk is maintained spaced from said housing by a plurality of electrically non-conductive springs extending between said disk and housing.

17. A transducer for converting vibratory mechanical energy into electrical energy comprising two spaced bodies mounted for vibration-sensitive movement relative to each other and having opposing electrically conductive surfaces, a shear-responsive liquid confined between said bodies, means adapted to move said bodies relative to each other in response to vibratory mechanical energy and an electrical circuit connected between said electrically conductive surfaces to measure a change in electrokinetic property of the liquid.

References Cited by the Examiner
UNITED STATES PATENTS

| | | | |
|---|---|---|---|
| 2,471,601 | 5/1949 | Albright | 73—71.4 X |
| 2,665,896 | 1/1954 | Kirby et al. | 73—516 X |
| 3,024,641 | 3/1962 | Fix | 73—35 |
| 3,046,502 | 7/1962 | Powell | 73—71.4 X |
| 3,104,334 | 9/1963 | Bradley | 73—71.2 X |
| 3,145,563 | 8/1964 | Hollander | 73—88.5 X |

OTHER REFERENCES

Forster et al.: Electrical Properties of some Carbon Black—Oil Suspensions, Journal of Applied Physics, vol. 22, No. 6, June 1951, pages 705–710.

RICHARD C. QUEISSER, *Primary Examiner.*

C. A. RUEHL, *Assistant Examiner.*